United States Patent

McMahon

[11] 4,107,518
[45] Aug. 15, 1978

[54] OPTICAL REPEATER

[75] Inventor: Donald H. McMahon, Carlisle, Mass.

[73] Assignee: Sperry Rand Corporation, New York, N.Y.

[21] Appl. No.: 762,694

[22] Filed: Jan. 26, 1977

[51] Int. Cl.² .............................................. H04B 9/00
[52] U.S. Cl. .................................................. 250/199
[58] Field of Search .................................... 250/199

[56] References Cited

U.S. PATENT DOCUMENTS

| 3,851,167 | 11/1974 | Levine | 250/199 |
| 4,019,048 | 4/1977 | Malone et al. | 250/199 |

*Primary Examiner*—Richard Murray
*Attorney, Agent, or Firm*—Howard P. Terry; Seymour Levine

[57] ABSTRACT

An optical repeater combines the functions of a passive star coupler and a signal regenerating amplifier. A divergence corrective device provides a means with which to more effectively utilize the optical energy radiated from a light emitting diode included in the signal regenerating amplifier. This increase in efficiency allows for the coupling of as much optical energy to each optical receiver of a multiplicity of optical receivers as would be coupled to a single optical receiver in a simple point-to-point link.

45 Claims, 6 Drawing Figures

OPTICAL REPEATER

BACKGROUND OF THE INVENTION

1. Field of the Invention

The invention pertains to an apparatus for coupling optical transmission lines and more particularly to apparatus wherein the coupling is accomplished through an active device to provide amplification of an optical signal transferred between the coupled optical waveguides.

2. Description of the Prior Art

In extending optical data link technology to multi-terminal applications, it is necessary to insure that sufficient light energy is coupled from one source terminal of a multiplicity of source terminals to any one of a multiplicity of data receiver terminals. Parameters that define the minimum optical energy required at each receiver terminal include the received signal bandwidth, the desired error rate, the detector efficiency and the noise figures of the detector and the amplifier. Optical power received at a receiver terminal depends upon the optical power generated by the light source at the transmitting terminal, the coupling efficiency between the light source and the transmission medium, the optical waveguide attenuation characteristics and coupling losses, power division, and packing fraction losses incurred at intermediate coupling points. The requirement of a minimum received signal level coupled with the inherent system losses limits the number of receiving terminals that may receive useable optical signals from a transmitting source terminal. This limitation is not improved when LED light sources, which provide relatively low optical output energy, and PIN photodetectors, which exhibit relatively high noise figure, are employed as the optical transmitting and detecting devices respectively.

One alternative to an LED-PIN optical link would be to employ a laser source and an avalanche photodiode detector. However, inexpensive long life laser sources are not yet available and when available may require temperature control to avoid burn out. Similarly, avalanche photo diodes are relatively expensive and also require temperature control. Therefore, for reasons of simplicity, reliability and economy, it is highly desirable to utilize an LED-PIN optical link.

The performance of LED-PIN optical links may be enhanced by utilizing a signal regenerating element as a repeater in a point-to-point optical network. Signal regeneration can readily be obtained by converting an optical signal incident to the repeater, that has been transmitted from a preceding terminal, to an electrical signal equivalent thereto, amplifying this electrical signal and using it to drive a light source which then couples an optical signal, representative of the incident optical signal, to an optical waveguide for transmission to the succeeding terminal. However, optical communication systems consisting of a series of point-to-point links are vulnerable to catastrophic failures that may occur when a repeater, transmitter, or receiver ceases to function A method for preventing this catastrophic failure, due to the malfunction of a single component, would be to employ a star coupler such as that described in U.S. Pat. No. 3,874,781 and properly inserting a repeater in each optical transmission line emanating therefrom. This requires a multiplicity of repeaters and negates the economy that is sought with the utilization of the LED-PIN link. Therefore, a need exists for providing an optical communications link that utilizes a minimum of signal regenerating elements while maintaining a highly reliable, economical system.

SUMMARY OF THE INVENTION

A star repeater embodying the principles of the present invention couples optical signals propagating in a multiplicity of optical transmission lines to a light detector, such as a PIN diode, which provides an electrical signal representative of the incident optical signals. The electrical signal output of the light detector is then coupled to an electrical signal amplifier from which the amplified electrical signal is coupled to a light generator such as an LED that in turn generates an optical signal representative of the electrical signal coupled thereto. The optical signal so generated is then coupled to a second mutiplicity of optical transmission lines. This total arrangement combines the action of many repeaters into one centrally located unit and catastrophic system failure can now occur only if the star repeater fails. Generally the star repeater may be an integral part of the master terminal of the system in which case total link collapse will occur only when the associated electronic systems thereat fails. As disclosed herein, the star repeater compensates for the various light losses encountered throughout the system, thus assuring an adequate optical signal level for reliable reception at each receiver terminal.

Another embodiment employing the principles of the present invention is a fan-out coupler, wherein a single optical transmission line is coupled to a photo detector wherein optical energy is converted to electrical energy at the output terminals thereof. The electrical energy at the output terminals are coupled to an electrical amplifier, the output terminal of which is coupled to a modulatable light source and the light therein generated is distributed across a coupling plane at which a multiplicity of optical transmission lines are coupled thus providing near equal levels of optical energy to each of these optical transmission lines.

Still another embodiment of the present invention is a fan-in coupler wherein light energy from a multiplicity of optical transmission lines are coupled to a single optical transmission line. In this embodiment, a multiplicty of optical transmission lines are coupled to a photodetector wherein the optical energy is converted to electrical energy at output terminals thereof. This electrical energy is coupled to an amplifier, the output of which is coupled to a modulatable light source and the light thereby generated is coupled therefrom to an optical waveguide for further transmission.

DESCRIPTION OF THE PREFERRED EMBODIMENTS

Figure 1:
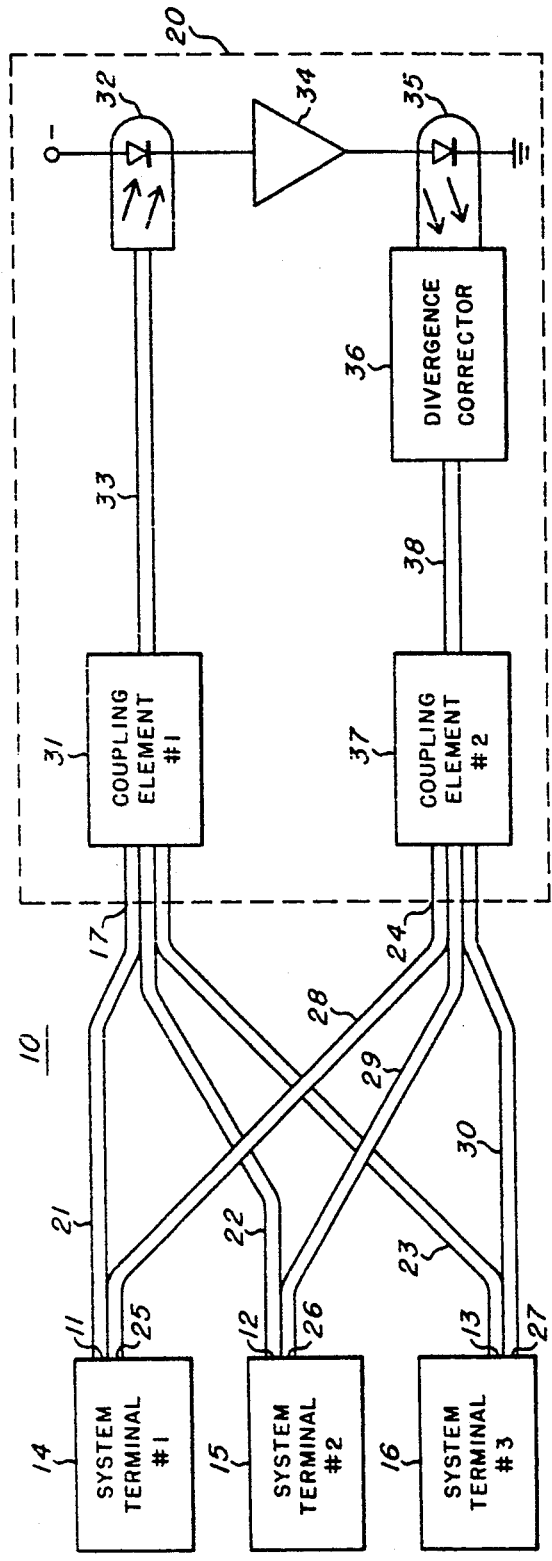
FIG. 1 is a diagram of an embodiment of the invention showing the coupling of a multiplicity of optical terminals through a single star repeater.

FIG. 1 illustrates an optical communications system 10 wherein output ports 11, 12, and 13 of the system terminals 14, 15 and 16 are coupled to the input port 17 of a star repeater 20 via optical transmission lines 21, 22, and 23, respectively, such that star repeater 20 receives the optical signals from system terminals 14, 15 and 16 in parallel. This combination of parallel optical signals is processed in the star repeater 20 and an optical signal representative of the combination is parallel coupled from the output port 24 of the star repeater 20 to the input ports 25, 26, and 27 of system terminals 14, 15, and 16, via optical transmission lines 28, 29 and 30, respectively.

The parallel coupled optical signals at input port 17 of the star repeater 20 may be coupled to photodetector 32 via coupling element 31 and optical transmission line 33. An electrical output signal of photodetector 32, generated in response to the optical signal incident thereto, is coupled to electrical amplifier 34, the amplified electrical output of which is coupled to modulatable light source 35 which generates an optical signal in response thereto. This optical signal may be coupled to output terminal 24 via divergence correction element 36, which alters the divergence of the light source to match a desired numerical aperture, and transmission line 38. Optical signals at output terminal 24 are parallel coupled to the input ports 25, 26, and 27 of system terminals 14, 15 and 16 via transmission lines 28, 29 and 30, respectively.

Figure 2:
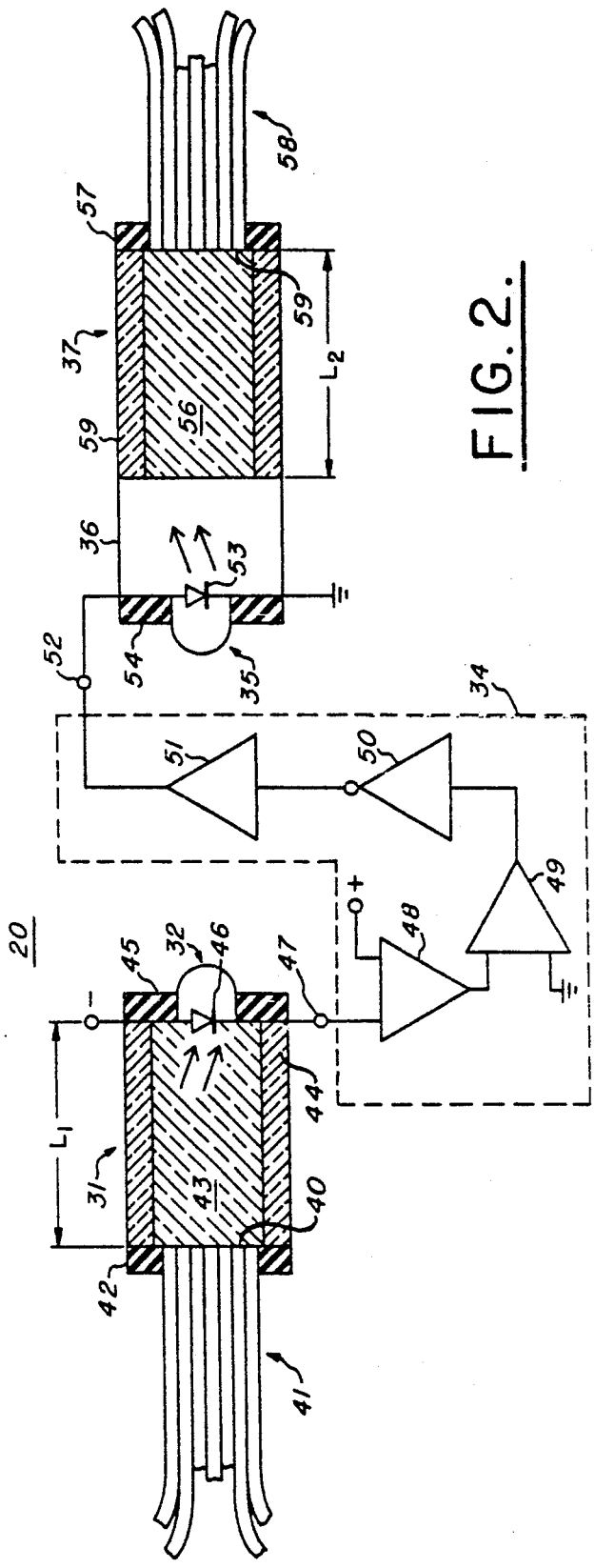
FIG. 2 is a diagram showing a construction of the star repeater that may be employed in FIG. 1.

A more detailed description of the star repeater 20 of FIG. 1 will now be presented with additional reference to FIG. 2, wherein elements similar to those of FIG. 1 are represented by the same reference numerals. In FIG. 2, a bundle of transmission lines 41, each with substantially the same numerical aperture, are maintained by end section 42 such that one end of each of the transmission lines within the bundle 41 terminates in a plane 40. Light detector 32 may be directly butt coupled to the ends of the transmission lines in plane 40 or to a core 43, of coupling element 31, the longitudinal axis of which is substantially perpendicular to the end section 42. The core 43 may be made of a transparent material with refractive index $n_1$ which may be surrounded by a cladding material 44 with refractive index $n_2$ that is sufficiently lower than the refractive index $n_1$ of the core 43 to maintain propagating light within the core 43 material and also to provide a numerical aperture $(NA)_1$ for the coupling element that is not less than the numerical aperture of each of the transmission lines within the bundle 41. Light energy coupled from any of the transmission lines within the bundle 41 propagates within the core 43 to uniformly illuminate a region, of diameter d, within an end section 45, of coupling element 31, which is positioned at a distance $L_1$ from end section 42, which should not be less than $(D+d) \sqrt{n_1^2 + [(NA)_1]^2}/2(NA)_1$. Photodetector 46, which may be a PIN diode such as a Texas Instruments TIXL 80 or an EG and G SHS-100 is positioned in the uniformly illuminated region of the second end section 45. End sections 42 and 45 may be provided with anti-reflection coatings such as paint or other well known materials in the regions adjacent to the illuminated regions to prevent the multiple reflections of light energy within the coupling element 31. The anode of PIN diode 46 is coupled to a negative source (not shown) while the cathode is coupled to the input terminal 47 of amplifier 34. Amplifier 34 comprises a transimpedance amplifier 48, the input terminal of which serves as the input terminal 47, an amplifier pulse regenerator 49, the input terminal of which is coupled to the output terminal of the transimpedance amplifier 48, and inverter 50, the input terminal of which is coupled to the ouput terminal of the amplifier pulse regenerator 49 and a totem pole driver 51, the input terminal of which is coupled to the output terminal of the inverter 50.

Current induced in PIN diode 46, in response to the illumination thereon, is coupled to the input terminal 47 of transimpedance amplifier 48, which may be a Texas Instruments TIXL 151, causing a voltage to appear at the output terminal thereof that is linearly proportional to the current at the input terminal. This voltage is coupled to the input terminal of amplifier pulse regenerator 49 which may include a Fairchild 733 IC, for providing voltage amplification, and a 760 IC, for squaring and reshaping voltage pulses coupled thereto. The output voltage from the amplifier pulse regenerator 49 is coupled to an inverter 50, which my be the inverters of a Texas Instruments SN 7404 used in parallel, and the voltage at the output terminal of inverter 50 is coupled to the input terminal of the totem pole driver 51, which comprises a circuit including a 2N3866 transistor and a 2N2905 transistor.

The output terminal of the totem pole driver 51 serves as the output terminal 52 of the amplifier 34. A modulatable light source 53, which is included in end secion 54 is coupled to terminal 52. End section 54 may be coated with an antireflection material, such as paint, in the regions other than the region of the modulatable light source 53 to prevent optical reflections therefrom. Modulatable light source 53 may be a light emitting diode (LED) with the anode thereof coupled to terminal 52. A bundle 58 of output transmission lines, each with a numerical aperture not less than $(NA)_2$ are maintained by end section 57 such that one end of each of the transmission lines within the bundle 58 terminates in plane 59. Light source 53 may be directly butt coupled to the ends of the transmission lines in plane 40 or to divergence corrector 36. When a voltage of sufficient amplitude is applied at terminal 52, modulatable light source 53 transmits an optical signal to the transmission lines in the bundle 58, or to divergence corrector 36 if coupled thereto. Divergence corrector 36, which may include a system of lenses, alters the angular divergence of a light beam emitted from the modulatable light source 53 to match the numerical aperture of the coupling element 37. With light source 53 coupled to divergence corrector 36, optical signals from divergence corrector 36 may be coupled to the core 56 of coupling element 37. The core 56 has a diameter $D_C$ and is made of transparent material with refractive index $n_3$ and is surrounded by a cladding material 59 with refractive index $n_4$ that is sufficiently lower than $n_3$ to maintain propagating light within the core 56 and to provide a numerical aperture $(NA)_2$. Optical signals coupled to core 56 propagate therethrough to uniformly illuminate a region with diameter D within end section 57 which is positioned at a distance $L_2$ from divergence corrector 36. $L_2$ should not be less than $(D_c + D) \sqrt{n_3^2 + [(NA)_2]^2}/2(NA)_2$ to insure uniform illumination of all of the optical transmission lines within the bundle 58. Regions of end section 57 not containing the bundle of optical transmission lines 58 may be coated with an anti-reflection material, such as paint or other suitable material to prevent optical reflections therefrom. Coupling light source 53 to the ends of the optical transmission lines contained in bundle 58 via divergence corrector 36 and coupling element 37 may provide a more effective utilization of the light power emitted from light source 53 than would the direct butt coupling of light source 53 to the ends of these optical transmission lines.

Figure 3:
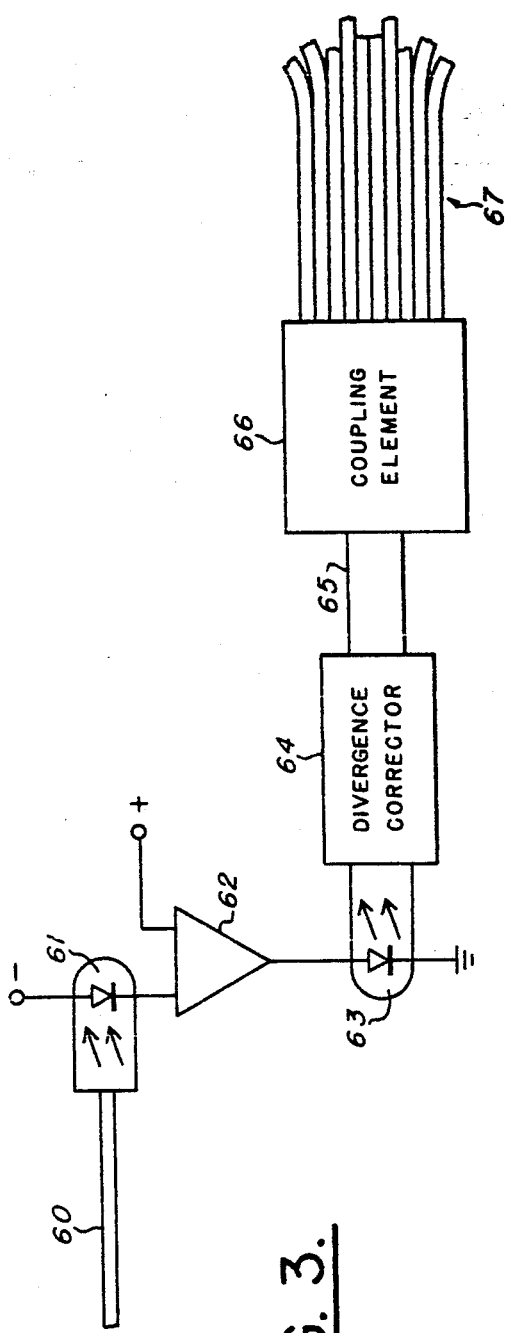
FIG. 3 is a diagram, partially in block form, of another embodiment of the invention, a fan-out star repeater.

Refer now to FIG. 3 wherein is shown a fan-out configuration of a star repeater. Fan-out coupling is the flaring of light energy from one or more optical waveguides to a greater number of such waveguides. Since the optical energy of the input waveguides is to be equally distributed between the output waveguides, a significant reduction in the optical signal level is experienced in each output optical waveguide. The principles of a star repeater, previously discussed, may be applied to a fan-out coupler to increase the optical signal energy coupled to each output optical waveguide. In FIG. 3, an optical waveguide 60 couples an optical signal to a photodetector 61, which may be a photodiode as previously discussed. Electrical current induced in response thereto is coupled to amplifier 62, which is similar to amplifier 34 of FIG. 2 previously described. A voltage at the output terminal of amplifier 62, which is provided in response to the current coupled to the input terminal thereof, is coupled to a modulatable light source 63, which may be a LED as previously discussed. This modulatable light source 63 emits an optical signal, in response to the voltage applied thereto that illuminates a divergence corrector 64. Divergence corrector 64 matches the angular divergence of the LED to the numerical aperture of an optical waveguide 65, through which the optical signal may be coupled to a coupling unit 66, which is similar to the coupling unit 37 of FIG. 2 previously described. It will be recognized that divergence corrector 64 may be directly coupled to coupling element 66 as is divergence corrector 36 and coupling element 37 in FIG. 2. The optical signal propagates through coupling element 66 to uniformly illuminate each optical transmission line, within the transmission line bundle 67, in the same manner as described for the coupling of light energy from coupling 37 to the transmission line bundle 58 of FIG. 2.

Fan-in coupling is the funneling of light energy propagating in a multiplicity of optical waveguides to a lesser number of optical waveguides. This type of coupling is extremely inefficient and fan-in couplers exhibit excessive losses. Optical power is transferred between an input optical waveguide but coupled to an output optical waveguide, of equal numerical aperture but smaller in cross-section, in proportion to the ratio of the area of the output optical waveguide to the input optical waveguide. McMahon, in an article published in the Journal of the Optical Society of America, Vol. 65 (1975), page 1479, shows that butt coupling of optical waveguides to a fan-in coupler represents the highest coupling efficiency that can be achieved in practice. Thus light funneled from N channels of a given type to a single channel of the same type, experiences an N fold power division loss. The star coupler shown in FIG. 4 provides the means for restoring the fan-in power division loss.

Figure 4:
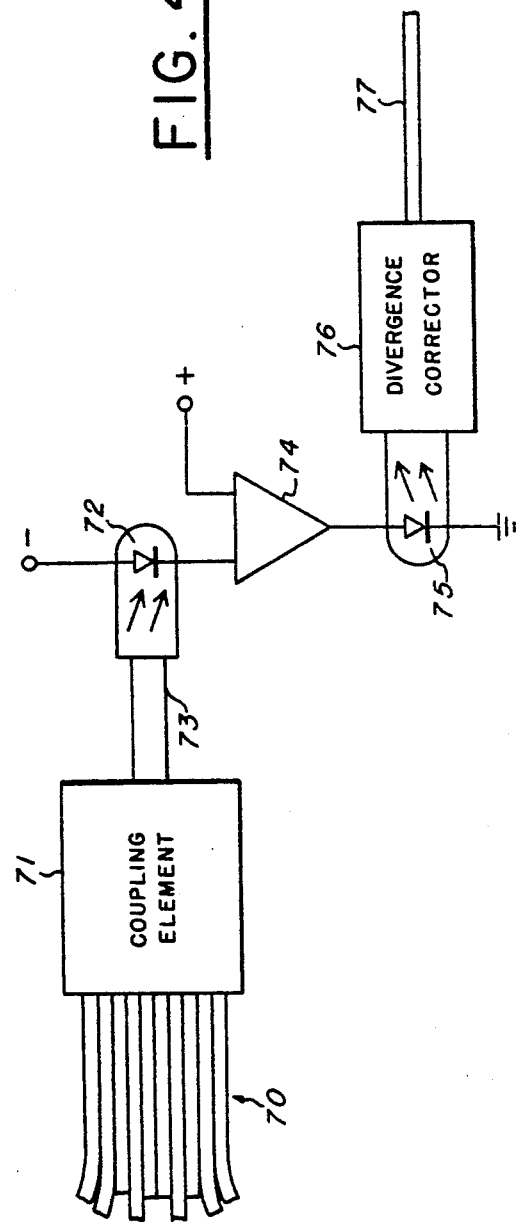
FIG. 4 is a diagram, partially in block form, of still another embodiment of the invention, a fan-in star repeater.

In FIG. 4 a bundle of optical transmission lines 70 are coupled to a coupling element 71 which is similar to the coupling element 31 of FIG. 2 previously described. Optical signals appearing in the output region of the coupling element 71 are coupled to a photo detector 72, which coupling may be through an optical transmission line 73. Photo detector 72 may be a PIN diode with the anode coupled to a negative d.c. source not shown and the cathode coupled to a amplifier 74 which is similar to the amplifier 34 of FIG. 2 previously described. The output voltage of the amplifier 74, which is representative of the input current thereto, is coupled to a modulatable light source 75 which may be a LED with the anode coupled to the output terminal of amplifier 74. Light emitted from LED 75, in response to the voltage coupled from amplifier 74, is coupled to divergence corrector 76, which may include a system of lenses. wherein the angular divergence of the light from LED 75 is altered to match the numerical aperture of the output transmission line 77 that is coupled to the divergence corrector 76.

Figure 5:
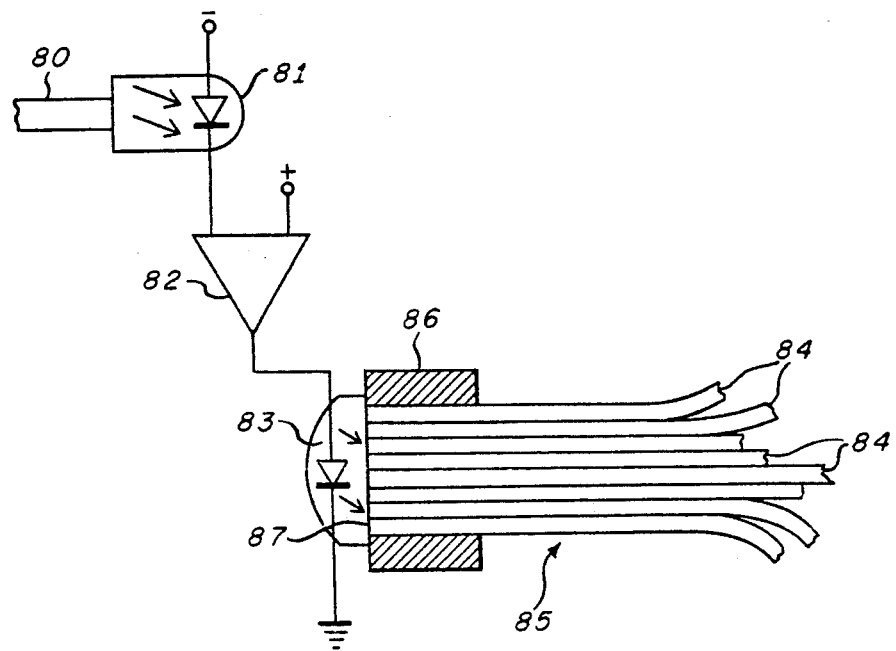
FIG. 5 is a diagram, partially in block form, of another configuration of a fan-out star repeater.
Figure 6:
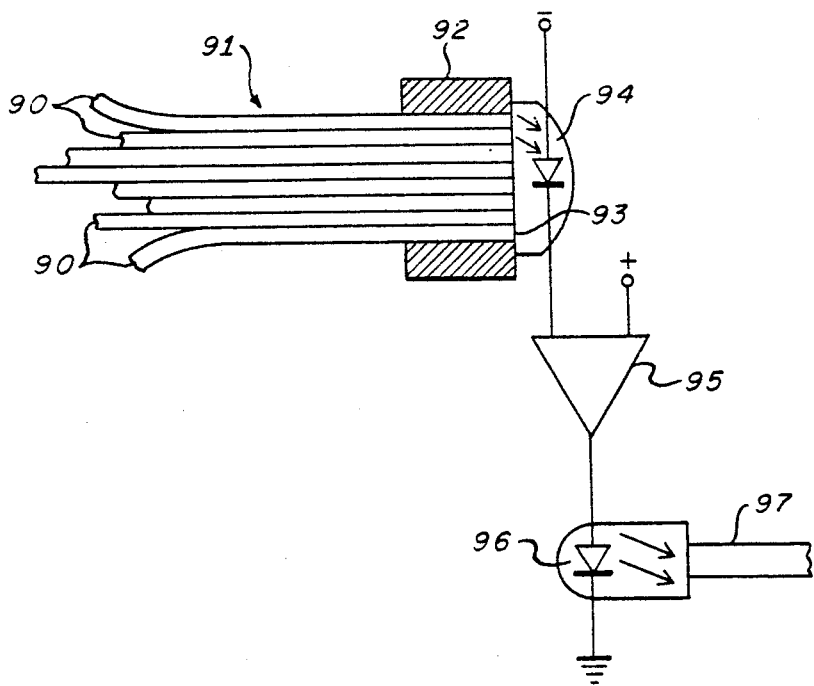
FIG. 6 is a diagram, partially in block form, of another configuration of a fan-in star repeater.

The fan-out coupler shown in FIG. 5 and the fan-in coupler shown in FIG. 6 provide more economical though perhaps less efficient configurations than the couples previously described. Referring to FIG. 5. wherein an optical waveguide 80 is shown coupled to a photodetector 81, which may be a photodiode as previously discussed. Electrical current induced in response thereto is coupled to an amplifier 82, which is similar to amplifier 34 of FIG. 2 previously described. A voltage at the output terminal of amplifier 82, which is representative of the current coupled to the input terminal thereof, is coupled to a modulatable light source 83, which may be a LED as previously discussed. Transmission lines 84 contained in the bundle 85 are maintained by a support means 86 such that one end of each of the transmission lines 84 terminates in a plane 87. Modulatable light source 83 is butt coupled to the ends of the transmission lines 84 terminating at the plane 87 and optical signals emitted from light source 83 are coupled to each of the transmission lines 84.

Refer now to FIG. 6 wherein is shown a plurality of optical transmission lines 90 contained in a bundle 91, optical transmission lines 91 being maintained by support means 92 such that one end of each transmission line 90 terminates in a plane 93. Photodetector 94, which is similar to the photodetector 46 of FIG. 2 previously described, is butt coupled to the ends of the transmission lines 92 terminating at the plane 93 such that optical signals from transmission lines 90 are coupled to photodetector 94. Photodetector 94 may be a PIN diode with the anode coupled to a negative d.c. source not shown and the cathode coupled to an amplifier 95 which is similar to the amplifier 34 of FIG. 2 previously described. The output voltage of the amplifier 95 which is representative of the input current, coupled from photodetector 94, is coupled to a modulatable light source 96, which may be a LED with the anode coupled to the output terminal of amplifier 95, thereby providing for the coupling of optical signals generated by LED 96, in response to voltages coupled thereto from amplifier 74, to an output transmission line 97.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. An optical repeater having a first plurality of optical signal transmission lines, each including a core of transparent material and at least one of which possesses a numerical aperture (NA)$_1$ and a core with refractive index $n_1$, and a second plurality of optical signal transmission lines, each including a core of transparent material and at least one of which possesses a numerical aperture (NA)$_2$ and a core with refractive index $n_2$ comprising:

means for disposing said first plurality of optical signal transmission lines such that each optical signal transmission line in said plurality of optical signal transmission lines terminates with an end face thereof in a plane, thereby forming a planar array of said end faces;

photodetector means coupled to receive optical signals emitted from said planar array of end faces of said first plurality of optical signal transmission lines for generating an electrical signal representative of said received optical signals;

amplifier means coupled to said photodetector means for providing an electrical signal at an output terminal that is representative of said electrical signal generated by said photodetector means;

means coupled to said output terminal of said amplifier means for generating an optical signal in response to said electrical signal at said output terminal; and means for disposing said second plurality of optical signal transmission lines such that each optical signal transmission line therein terminates with an end face thereof in a plane, thereby forming a planar array of end faces, said planar array coupled to receive said optical signal from said optical signal generating means such that said optical signal is coupled to each optical signal transmission line of said second plurality of optical signal transmission lines, whereby an optical signal propagating in one optical signal transmission line contained in said first plurality of optical signal transmission lines causes an optical signal representative thereof to propagate in each optical signal transmission line contained in said second plurality of optical signal transmission lines.

2. An optical repeater in accordance with claim 1 wherein said photodetector means is butt coupled to said planar array of end faces of said first plurality of optical signal transmission lines and said optical signal generating means is butt coupled to said planar array of end faces of said second plurality of optical signal transmission lines.

3. An optical repeater in accordance with claim 2 wherein said photodetector means is a PIN diode and said light generating means is a light emitting diode (LED).

4. An optical repeater in accordance with claim 3 wherein said amplifier means includes:

an amplifier coupled to receive electrical current generated by said PIN diode in response to the illumination thereof and to provide a voltage at an output terminal that is proportional to said electrical current;

a voltage amplifier coupled to receive said voltage at said output terminal of said amplifier and having an output terminal whereat a voltage is coupled that is of greater amplitude than said voltage coupled from said amplifier;

an inverter having an output terminal and an input terminal coupled to said output terminal of said voltage amplifier; and a driver having an input terminal coupled to said output terminal of said inverter and an output terminal coupled to the anode of said LED.

5. An optical repeater in accordance with claim 1 further including:

first coupling means having a first end coupled to said planar array of end faces of said first plurality of optical signal transmission lines for directing optical signals emitted from each end face of said first plurality of optical signal transmission lines to uniformly illuminate a predetermined region in a second end whereat said photodetector means is coupled; and second coupling means possessing a numerical aperture and having a predetermined region in a first end whereat optical signals from said optical signal generating means are coupled, said light energy propagating through said second coupling means to uniformly illuminate a predetermined region in a second end thereof, whereat said planar array of end faces of said second plurality of optical signal transmission lines are coupled.

6. An optical repeater in accordance with claim 5 further including divergence corrector means coupled between said optical signal generating means and said second coupling means for altering the divergence of light emitted from said optical signal generating means to substantially match said numerical aperture of said second coupling means.

7. An optical repeater in accordance with claim 6 further including an optical signal transmission line coupled between said illuminated region of said second end of said first coupling means and said photodetector means and an optical transmission line coupled between said divergence corrector means and said predetermined region of said first end of said second coupling means.

8. An optical repeater in accordance with claim 6 wherein said photodetector means is a PIN diode and said light generating means is a light emitting diode (LED).

9. An optical repeater in accordance with claim 8 wherein said amplifier means includes:

an amplifier coupled to receive electrical current generated by said PIN diode in response to the illumination thereof and to provide a voltage at an output terminal that is proportional to said electrical current;

a voltage amplifier coupled to receive said voltage at said output terminal of said amplifier and having an output terminal whereat a voltage is coupled that is of greater amplitude than said voltage coupled from said amplifier;

an inverter having an output terminal and an input terminal coupled to said output terminal of said voltage amplifier; and a driver having an input terminal coupled to said output terminal of said inverter and an output terminal coupled to the anode of said LED.

10. An optical repeater in accordance with claim 5 wherein:

said first plurality of optical signal transmission lines are grouped into a bundle, the cross-section of which is circumscribed by a circle of diameter $D_1$, said bundle substantially centrally located in said first end of said first coupling means and said predetermined region in said second end of said first coupling means having a diameter $d$ substantially centrally located therein;

said second plurality of optical signal transmission lines are grouped into a bundle, the cross-section of which is circumscribed by a circle of diameter $D_2$, said bundle substantially centrally located in said second end of said second coupling means;

said first coupling means possesses a numerical aperture $(NA)_3$ and includes a core of transparent material with a cladding material thereabout, said core having a refractive index $n_3$, said core and said cladding material extending a length $L_1$ between said first and second ends satisfying the equation $$L_1 \geq (D_1 + )\sqrt{n_3^2 + [(NA)_1]^2} / 2(NA)_1;$$

said second coupling means possesses a numerical aperture $(NA)_4$ and includes a core of transparent material with a cladding material thereabout, said core having a refractive index $n_4$ and a diameter $D_C$, said core and said cladding material having a length $L_2$ extending to said second end piece of said second coupling means satisfying the equation:

$$L_2 \geq (D_C + D_2)\sqrt{n_4^2 + [(NA)_2]^2} / 2(NA)_2;\ \text{and}$$

said divergence corrector means is coupled between said first end and said core of said coupling means.

11. An optical repeater in accordance with claim 10 wherein said photodetector means is a PIN diode, said light generating means is a LED and said amplifying means includes:

an amplifier coupled to the cathode of said PIN diode to receive electrical current generated by said PIN diode in response to the illumination thereof and to provide a voltage at an output terminal that is linearly related to said electrical current;

a voltage amplifier coupled to receive said voltage at said output terminal of said amplifier and having an ouput terminal whereat a voltage is coupled that is of greater amplitude than said voltage coupled from said amplifier;

an inverter having an input terminal coupled to receive said voltage from said output terminal of said voltage amplifier and an output terminal; and a driver having an input terminal coupled to said output terminal of said inverter and an output terminal coupled to the anode of said LED.

12. An optical repeater in accordance with claim 10 wherein the refractive index of said cores of each of said optical signal transmission lines within said first plurality of optical signal transmission lines is substantially equal to said index of refraction $n_1$ and each of said optical signal transmission lines of said first plurality of optical transmission lines possesses a numerical aperture substantially equal to said numerical aperture $(NA)_1$.

13. An optical repeater in accordance with claim 12 wherein said refractive index $n_1$ of said cores of said optical signal transmission lines within said first plurality of optical signal transmission lines and said refractive index $n_3$ of said first coupling means are substantially equal.

14. An optical repeater in accordance with claim 13 wherein said numerical aperture $(NA)_3$ of said first coupling means is at least as large as said numerical aperture $(NA)_1$ of each of said optical signal transmission lines within said first plurality of optical signal transmission lines.

15. An optical repeater in accordance with claim 10 wherein the refractive index of said cores of each of said optical signal transmission lines within said second plurality of optical signal transmission lines are substantially equal to said refractive index $n_2$ and each of said optical transmission lines of said second plurality of optical signal transmission lines possesses a numerical aperture substantially equal to said numerical aperture $(NA)_2$.

16. An optical repeater in accordance with claim 15 wherein said refractive index $n_2$ of said cores of optical signal transmission lines within said second plurality of optical signal transmission lines and said refractive index $n_4$ of said second coupling means are substantially equal.

17. An optical repeater in accordance with claim 15 wherein said numerical aperture $(NA)_4$ of said second coupling means is not larger than said numerical aperture $(NA)_2$ of each of said optical signal transmission lines within said second plurality of optical signal transmission lines.

18. An optical repeater having at least one input optical signal transmission line and a plurality of output optical signal transmission lines each including a core of transparent material, at least one of which possesses a numerical aperture (NA) and has a core of refractive index $n$, said plurality of output optical transmission lines being of greater number than said at least one input optical transmission line, said optical repeater comprising:

photodetector means coupled to said at least one input optical transmission line for detecting light energy propagating therein and generating an electrical signal representative of said light energy;

amplifier means coupled to said photodetector means for providing an electrical signal at an output terminal that is proportional to said electrical signal generated by said photodetector means;

means coupled to said output terminal of said amplifier means for generating an optical signal in response to said electrical signal at said output terminal of said amplifier means; and coupling means possessing a numerical aperture $(NA)_1$, and having a predetermined region in a first end section whereat optical signals from said optical signal generating means are coupled, said predetermined region in said first end section in optical energy coupling relationship with a predetermined region in a second end section such that optical energy coupled to said predetermined region of said first end section uniformly illuminates a predetermined region in a second end section thereof, whereat said plurality of output optical transmission lines are coupled, whereby an optical signal propagating in said at least one input optical signal transmission line causes an optical signal representative thereof to propagate in each optical signal transmission line contained in said plurality of output optical signal transmission lines.

19. An optical repeater in accordance with claim 18 further including a divergence corrector means coupled between said optical signal generating means, and said coupling means for altering the divergence of light emitted from said optical signal generating means to substantially match said numerical aperture of said coupling means.

20. An optical repeater in accordance with claim 19 further including an optical transmission line, possessing a numerical aperture substantially equal to said numerical aperture of said coupling element, coupled between said divergence corrector means and said predetermined region in said first end section of said coupling element.

21. An optical repeater in accordance with claim 19 wherein said photodetector means is a PIN diode and said optical signal generating means is a light emitting diode (LED).

22. An optical repeater in accordance with claim 21 wherein said amplifier means includes:
a first amplifier coupled to receive electrical current generated by said PIN diode in response to the illumination thereof, said first amplifier providing a voltage at an output terminal that is proportional to said electrical current;
a second amplifier coupled to receive said voltage at said output terminal of said first amplifier and having an output terminal whereat a voltage is coupled that is of greater amplitude than said voltage coupled from said first amplifier;
an inverter having an output terminal and an input terminal coupled to said output terminal of said second amplifier; and
a driver circuit having an input terminal coupled to said output terminal of said inverter and an output terminal coupled to the anode of said LED.

23. An optical repeater in accordance with claim 19 wherein
said plurality of optical transmission lines are grouped into a bundle, the cross-section of which is circumscribed by a circle of diameter D, said bundle substantially centrally located in said second end section of said coupling means;
said coupling means includes a core of transparent material of refractive index $n_1$, numerical aperture $(NA)_1$, and diameter $D_C$ with a cladding material thereabout, said core and said cladding material extending a length L to said second end section satisfying the equation $$L \geq (D_C + D) \sqrt{n_1^2 + (NA)_1^2} / 2(Na)_1; \text{ and}$$

said divergence corrector means is coupled between said first end section and said core of said second coupling means.

24. An optical repeater in accordance with claim 23 wherein said photodetector means is a PIN diode and said optical signal generating means is a LED.

25. An optical repeater in accordance with claim 24 wherein said amplifying means includes:
a transimpedance amplifier coupled to receive electrical current generated by said PIN diode in response to the illumination thereof, said transimpedance amplifier providing a voltage at an output terminal that is proportional to said electrical current;
a voltage amplifier coupled to receive said voltage at said output terminal of said transimpedance amplifier and having an output terminal whereat a voltage is coupled that is of greater amplitude than said voltage coupled from said transimpedance amplifier;
an inverter having an input terminal coupled to said output terminal of said voltage amplifier and an output terminal; and
a driver circuit having an output terminal coupled to said output terminal of said inverter and an output terminal coupled to the anode of said LED.

26. An optical repeater in accordance with claim 23 wherein the refractive index of said cores of each of said optical signal transmission lines within said plurality of optical signal transmission lines are substantially equal to said refractive index N and each of said optical transmission lines of said plurality of optical signal transmission lines possesses a numerical aperture substantially equal to said numerical aperture (NA).

27. An optical repeater in accordance with claim 26 wherein said refractive index N of said cores of optical signal transmission lines within said plurality of optical signal transmission lines and said refractive index $n_1$ of said coupling means are substantially equal.

28. An optical repeater in accordance with claim 27 wherein said numerical aperture $(NA)_1$ of said coupling means is not less than than said numerical aperture (NA) of each of said optical signal transmission lines within said plurality of optical signal transmission lines.

29. An optical repeater having a plurality of input optical transmission lines, each including a core of transparent material, at least one of which possesses a numerical aperture $(NA)_1$ and has a core of refractive index $n_1$, and at least one output optical transmission line having a numerical aperture $(NA)_2$ and a core of refractive index $n_2$, the total number of said output optical transmission lines being less than the total number of said input optical transmission lines comprising:
coupling means coupled to said plurality of input optical transmission lines at a first end section wherefrom optical signals from said of said input optical transmission lines propagate to uniformly illuminate a substantially centrally located region of diameter $d$ in a second end section;
photodetector means coupled to said illuminated region for detecting light energy thereat and generating an electrical signal representative thereof;
amplifier means coupled to said photodetector means for providing an electrical signal at an output terminal that is proportional to said electrical signal generated by said photodetector means;
means coupled to said output terminal of said amplifier means for generating an optical signal in response to said electrical signal at said output terminal of said amplifier means whereby said generated optical signal is representative of optical signals propagating in said plurality of said input optical signal transmission lines.

30. An optical repeater in accordance with claim 29 further including divergence corrector means coupled between said optical signal generating means and said at least one optical transmission line for altering the divergence of light emitted from said optical signal generating means to match said numerical aperture of said at least one optical transmission line.

31. An optical repeater in accordance with claim 30 further including an optical transmission line coupled between said uniformly illuminated region of said second end section and said photodetector means.

32. An optical repeater in accordance with claim 30 wherein said photodetector means is a PIN diode and said optical signal generating means is an LED.

33. An optical repeater in accordance with claim 32 wherein said amplifier means includes:
a first amplifier coupled to receive electrical current generated by said PIN diode in response to the illumination thereof, said first amplifier providing a voltage at an output terminal that is proportional to said electrical current;

a second amplifier coupled to receive said voltage at said output terminal of said first amplifier and having an output terminal whereat a voltage is coupled that is of greater amplitude than said voltage coupled from said first amplifier;

an inverter having an input terminal coupled to said output terminal of said second amplifier and an output terminal; and a driver circuit having an input terminal coupled to said output terminal of said inverter and an output terminal coupled to the anode of said LED.

34. An optical repeater in accordance with claim 30 wherein:

said plurality of optical transmission lines are grouped into a bundle, the cross-section of which is circumscribed by a circle of diameter D, said bundle substantially centrally located in said first end section of said coupling means;

said coupling means possesses a numerical aperture $(NA)_3$ and includes a core of transparent material of refractive index $n_3$ and a diameter at least as great as the diameter D of said bundle with a cladding material thereabout, said core and said cladding material extending a length L between said first and second end sections satisfying the equation:

$$L \geq (D + d) \sqrt{n_3^2 + (NA)_3^2} / 2(NA)_3.$$

35. An optical repeater in accordance with claim 34 wherein said photodetector means is a PIN diode and said optical signal generating means is a LED.

36. An optical repeater in accordance with claim 35 wherein said amplifying means includes:

a transimpedance amplifier coupled to receive electrical current generated by said PIN diode in response to the illumination thereof, said transimpedance amplifier providing a voltage at an output terminal that is proportional to said electrical current;

a voltage amplifier coupled to receive said voltage at said output terminal of said transimpedance amplifier and having an output terminal whereat a voltage is coupled that is of greater amplitude than said voltage coupled from said transimpedance amplifier;

an inverter having an input terminal coupled to said output terminal of said voltage amplifier and an output terminal; and a driver circuit having an input terminal coupled to said output terminal of said inverter and an output terminal coupled to the anode of said LED.

37. An optical repeater in accordance with claim 34 wherein the refractive index of said cores of each of said optical signal transmission lines within said plurality of optical signal transmission lines are substantially equal to said refractive index $n_1$ and each of said optical transmission lines of said plurality of optical signal transmission lines possesses a numerical aperture substantially equal to said numerical aperture $(NA)_1$.

38. An optical repeater in accordance with claim 37 wherein said refractive index $n_1$ of said cores of optical signal transmission lines within said plurality of optical signal transmission lines and said refractive index $n$ of said coupling means are substantially equal.

39. An optical repeater in accordance with claim 38 wherein said numerical aperture $(NA)_3$ of said coupling means is at least as large as said numerical aperture $(NA)_1$ of each of said optical signal transmission lines within said plurality of optical signal transmission lines.

40. An optical repeater having at least one input optical signal transmission line and a plurality of output optical signal transmission lines each including a core of transparent material, at least one of which possesses a numerical aperture (NA) and has a core of refractive index $n$, said plurality of output optical transmission lines being of greater number than said at least one input optical transmission line, said optical repeater comprising:

photodetector means coupled to said at least one input optical signal transmission line for detecting light energy propagating in said at least one optical transmission line and generating an electrical signal representative of said light energy;

amplifier means coupled to said photodetector means for providing an electrical signal at an output terminal that is representative of said electrical signal generated by said photodetector means;

means coupled to said output terminal of said amplifier means for generating an optical signal in response to said electrical signal at said output terminal of said amplifier means; and means for maintaining said plurality of output optical signal transmission lines such that end faces terminating said transmission lines are disposed in a planar array, said end faces terminating in said planar array being butt coupled to said optical signal generator means, wherefrom optical signals are coupled to said plurality of optical transmission lines which are representative of optical signals propagating in said at least one optical transmission line.

41. An optical repeater in accordance with claim 40 wherein said photodetector means is a PIN diode and said optical signal generating means is a light emitting diode (LED).

42. An optical repeater in accordance with claim 41 wherein said amplifier means includes:

a first amplifier coupled to receive electrical current generated by said PIN diode in response to the illumination thereof, said first amplifier providing a voltage at an output terminal that is proportional to said electrical current;

a second amplifier coupled to receive said voltage at said output terminal of said first amplifier and having an output terminal whereat a voltage is coupled that is of greater amplitude than said voltage coupled from said first amplifier;

an inverter having an output terminal and an input terminal coupled to said output terminal of said second amplifier; and a driver circuit having an input terminal coupled to said output terminal of said inverter and an output terminal coupled to the anode of said LED.

43. An optical repeater having a plurality of input optical signal transmission lines, each including a core of transparent material, at least one of which possesses a numerical aperture $(NA)_1$ and has a core of refractive index $n_1$, and at least one output optical signal transmission lines having a numerical aperture $(NA)_2$ and a core of refractive index $n_2$, said plurality of input optical signal transmission lines being of greater number than said at least one output optical signal transmission line, said optical repeater; comprising:

support means for maintaining said plurality of input optical signal transmission lines, such that end faces terminating said input optical signal transmission lines are disposed in a planar array;

photodetector means butt coupled to said end faces terminating in said planar array, for detecting optical signals coupled from said end faces and generating an electrical signal representative thereof;

amplifier means coupled to said photodetector means for providing an electrical signal at an output terminal that is proportional to said electrical signal generated by said photodetector means; and means coupled between said output terminal of said amplifier means said at least one output optical signal transmission line coupled to receive said generated optical signal whereby optical signals are coupled to said at least one optical signal transmission line which are representative of optical signals propagating in said plurality of input optical signal transmission lines for generating an optical signal in response to said electrical signal at said output terminal of said amplifier means.

44. An optical repeater in accordance with claim 43 wherein said photodetector means is a PIN diode and said optical signal generating means is an LED.

45. An optical repeater in accordance with claim 44 wherein said amplifier means includes:

a first amplifier coupled to receive electrical current generated by said PIN diode in response to the illumination thereof, said first amplifier providing a voltage at an output terminal that is proportional to said electrical current;

a second amplifier coupled to receive said voltage at said output terminal of said first amplifier and having an output terminal whereat a voltage is coupled that is of greater amplitude than said voltage coupled from said first amplifier;

an inverter having an input terminal coupled to said output terminal of said second amplifier and an output terminal; and a driver circuit having an input terminal coupled to said output terminal of said inverter and an output terminal coupled to the anode of said LED.

* * * * *